United States Patent [19]

Engels

[11] 4,334,784
[45] Jun. 15, 1982

[54] METHOD FOR PROCESSING THERMOPLASTICS OR THERMOSETTING PLASTICS

[75] Inventor: Kaspar Engels, Mannheim, Fed. Rep. of Germany

[73] Assignee: Draiswerke GmbH, Mannheim-Waldorf, Fed. Rep. of Germany

[21] Appl. No.: 63,401

[22] Filed: Aug. 3, 1979

Related U.S. Application Data

[63] Continuation of Ser. No. 811,185, Jun. 29, 1977, abandoned.

[30] Foreign Application Priority Data

May 11, 1977 [DE] Fed. Rep. of Germany ....... 2721169

[51] Int. Cl.³ .............................................. B28C 7/04
[52] U.S. Cl. ........................................ 366/76; 222/55; 222/135; 366/152; 366/158; 366/173; 366/179
[58] Field of Search .................. 366/76, 99, 102, 156, 366/158, 167, 160–162, 168, 172, 173, 177, 179, 279, 181–183, 189, 192, 193, 79–83, 18; 222/55, 135; 198/505

[56] References Cited

U.S. PATENT DOCUMENTS

| | | | |
|---|---|---|---|
| 617,866 | 1/1899 | Somasco | 366/76 |
| 2,138,172 | 11/1938 | Johnson | 366/18 |
| 2,285,765 | 6/1942 | Carswell | 366/18 |
| 2,962,172 | 11/1960 | Fath et al. | 198/505 |
| 3,091,369 | 5/1963 | Sackett, Sr. | 366/18 |
| 3,123,342 | 3/1964 | Little | 366/76 |
| 3,163,403 | 12/1964 | Engels | 366/149 |
| 3,266,738 | 8/1966 | Goeser et al. | 241/98 |
| 3,312,374 | 4/1967 | Whitlock | 366/161 X |
| 3,430,751 | 3/1969 | Bateson | 198/505 |
| 3,685,804 | 8/1972 | Stansfield | 366/75 |
| 3,694,227 | 9/1972 | Vezzani | 366/99 X |
| 3,814,289 | 6/1974 | Robbins | 222/135 |
| 3,920,223 | 11/1975 | Krueger | 366/156 |
| 3,995,838 | 12/1976 | Zucker | 366/160 |

FOREIGN PATENT DOCUMENTS 601232 8/1934 Fed. Rep. of Germany.
1118959 12/1961 Fed. Rep. of Germany.

Primary Examiner—Philip R. Coe
Assistant Examiner—Timothy F. Simone
Attorney, Agent, or Firm—Browdy and Neimark

[57] ABSTRACT

A method of processing plastic material uses a device which operates in a batchwise fashion. The device includes a cylindrical container having a shaft disposed coaxially therein. The shaft is provided with mixing tools and can be driven at high speed. Material to be processed, and liquid if desired, is supplied to the container in pre-metered amounts, gelled by resultant frictional heat and granulated, if necessary, then expelled from the container. The material is supplied in a continuous, metered constant quantity stored temporarily and then fed into the container cyclically at predetermined intervals. The apparatus for carrying out the method includes at least one metering device which feeds an intermediate container and instrumentalities for cyclically emptying the intermediate container into the cylindrical container.

7 Claims, 5 Drawing Figures

METHOD FOR PROCESSING THERMOPLASTICS OR THERMOSETTING PLASTICS

This is a continuation of application Ser. No. 811,185 filed June 29, 1977, abandoned.

BACKGROUND OF THE INVENTION

This invention relates to a method of processing thermoplastics or thermosetting plastics using batchwise operating device. The device includes a cylindrical container with a shaft disposed coaxially therein, the shaft being provided with mixing tools and drivable at high speed. The material to be processed, and if required liquid, is supplied to the container in predetermined amounts, gelled by the resultant frictional heat, granulated if necessary, then expelled from the container. The present invention also relates to an apparatus for carrying out the method.

In a method of this kind, known from German Auslegeschrift 11 18 959, the plastic raw materials are supplied batchwise to the device described hereinabove, together with colorant, filler, stabilizers, internal lubricants and the like, then gelled by the internal frictional heat generated during operation of the shaft provided with mixing tools, and granulated if necessary. The process and the device described hereinabove have proven extraordinarily satisfactory in practice, since the processing time is only approximately 30-180 seconds.

An improvement on the device described hereinabove is known from U.S. Pat. No. 3,266,738, wherein a shearing screw is disposed on the shaft outside the container, but connected with the latter via an opening, the shearing screw serving to chop plastic scrap and feed it to the container in order to allow processing of such plastic scrap. In this known device, the mixing tools are designed to serve simultaneously as cutting tools.

U.S. Pat. No. 3,163,403 discloses a continuously operating device for processing thermoplastics and thermosetting plastics in a single work step; this device includes a cylindrical mixing container with a shaft provided with mixing tools, the shaft being disposed coaxially therein and drivable at high speed. A material inlet is provided at one end of the container and a material outlet is provided at the other end of the container. Injection nozzles for a liquid to be supplied are provided along the container and/or along the shaft. A mixing and heating zone followed by a cooling zone are provided next to the material inlet opening. The shaft is provided with mixing arms of different numbers and designs in the mixing and heating zone and the continuous cooling zone. Alternatively, the shaft can be driven in the cooling zone at a lower speed than in the mixing and heating zone. This is intended to ensure that a great deal of energy is conducted into the material in the mixing and heating zone by the mixing tools, while in the contiguous cooling zone only a small amount of energy is added, since this area is designed for the removal of heat. This continuously operating device necessarily presupposes a certain machine size and a certain material throughput in order to operate satisfactorily, i.e., a continuously operating machine of this type can only operate economically in large installations.

In terms of the uniformity of processing of the material, batchwise operating devices are always optimal, because in this case there is a higher probability that all of the material particles will be charged with energy to the same degree. This is especially true of smaller machines and smaller throughput volumes.

However, a general disadvantage of devices which operate batchwise is that the complete cycles are relatively long, because a great deal of time is lost in metering the charge and loading the device with the charge, starting the device, and stopping and emptying the device. In addition, the charging time periods, i.e., the time periods required for filling, starting, and stopping and/or emptying, i.e., the time periods spend in handling alone, are relatively long.

SUMMARY OF THE INVENTION

The principal object of the present invention is to improve the method described hereinabove in such a manner that the cycles and charging times are shortened.

A further object of the present invention is to provide an improved apparatus for carrying out the method.

The foregoing objects, as well as others which are to become evident from the text below, are achieved in a method of the type described hereinabove by supplying the material in a continuous constant volume, storing it temporarily, and feeding it into the container cyclically at predetermined time intervals.

The gist of the invention, therefore, is in the fact that a batchwise operating device is supplied with a continuous flow of material, the material being temporarily stored only during the cycles, and then being dispensed suddenly batchwise into the container of the device. The metering time period is consequently completely eliminated.

This method of the present invention makes it possible to reduce the previously required charging time periods, which ranged from about 30 seconds to about 180 seconds, required for the device described hereinabove to a range from about 3 seconds to about 20 seconds. This means that in the case of a predetermined amount of material to be processed per unit time, the size of the device to be used can be reduced by approximately one-tenth. If conventional plastic processing machinery is fed by the apparatus of the present invention, devices for processing thermoplastics or thermosetting plastics can be used which, practically speaking, need be no larger than laboratory size, and consequently have, for example, a container volume of 2 or 3 liters.

In addition, when liquid is fed into the device for processing thermoplastics or thermosetting plastics, it is advantageous for the liquid likewise to be supplied in a continuous, constant volume, to be stored temporarily, and to be fed cyclically into the container at predetermined time intervals, whereby these time intervals correspond to the cycles. Of course, the addition of the liquid need not occur simultaneously with that of the materials to be processed; for example, it can take place during the processing of the plastic raw materials.

The fact that the shaft of the device according to an especially advantageous embodiment is continuously driven, after the container is emptied, the amount of material which was metered during the previous cycle can be fed into the container with the shaft still turning, thus eliminating the time lost in starting and/or stopping the device.

The charging time, during which a charge is prepared, is shorter than the cycle during which a charge is dispensed continuously, so that the continuous metering need never be interrupted.

In an especially advantageous further improved variant of the invention, the material is subjected to an approximately constant force during processing, thus further shortening the charging time. In view of the considerable changes in the force to which the material is subjected during the charging time at constant rpm (the material becomes increasingly viscous during processing and offers a steadily increasing resistance to the mixing tools until melting takes place), the rpm decreases during the charging time with approximately constant application of power.

An apparatus for carrying out the method according to the present invention, which also comprises the device described hereinabove, is characterized by the fact that the device is preceded by a continuously operating metering stage for the material, the metering stage being followed by an intermediate container which is emptied cyclically into the device. The metering stage meters the material continuously during one cycle into the intermediate container, which then discharges suddenly into the device. Then, during the next cycle, the next premetered amount of the charge is fed into the intermediate container. The metering stage is advantageously designed as a feed screw operating volumetrically. In the case of materials with markedly varying density, it is advantageous to locate a gravimetric monitoring device downstream from the feed screw, the monitoring device indicating the actual amount (by weight) delivered per unit time, so that the speed of the feed screw can be controlled either manually or by means of an automatic control device.

If a liquid, for example a plasticizer, is to be fed to the device, a continuously operating metering pump for liquid is advantageously installed upstream from the device, the pump being provided with an intermediate liquid container which discharges the liquid cyclically into the device. Thus, the same metering and dispensing principle is used for supplying the liquid as for supplying the material. The intermediate liquid container is advantageously made in the form of a pressurized vessel, so that the addition of the liquid from this intermediate liquid container into the device can be accomplished in an extremely short time. Application of approximately constant power to the shaft and consequently to the mixing tools, independently of the resistance which the material offers to the mixing tools, can be accomplished in simple fashion by making the shaft drivable through a hydrodynamic drive. Such a hydrodynamic drive appropriately changes its speed in accordance with the varying torques on the output side.

Especially rapid feed of the material from the intermediate container to the cylindrical container of the device is advantageously accomplished by locating, downstream of the intermediate container, a feed screw which terminates in the cylindrical container and is firmly connected to the shaft. This feed screw therefore rotates continuously at high speed with the shaft, so that the charge, falling suddenly from the intermediate container into the feed screw, is fed into the cylindrical container in fractions of a second. This makes the feed time extremely short.

Therefore, in theory the cycles of the installation are completely independent of the charging times, whereby it is naturally necessary in practice only to be sure that the dead time periods between the charging times and the cycles are not too long, i.e., that an excessively long dead time period does not follow the ejection of a charge out of the device before the next charge is metered and can be fed into the container of the device. The materials, i.e., plastic raw materials, involved can be, in particular, those which are available in powder form or granular form, or those with a pasty consistency. The critical factor is that the materials must be capable of being metered continuously.

BRIEF DESCRIPTION OF THE DRAWINGS

Further advantages and features of the present invention are to become apparent from the description of an illustrative embodiment with reference to the accompanying drawing.

DETAILED DESCRIPTION OF THE PREFERRED EMBODIMENT

Figure 1:
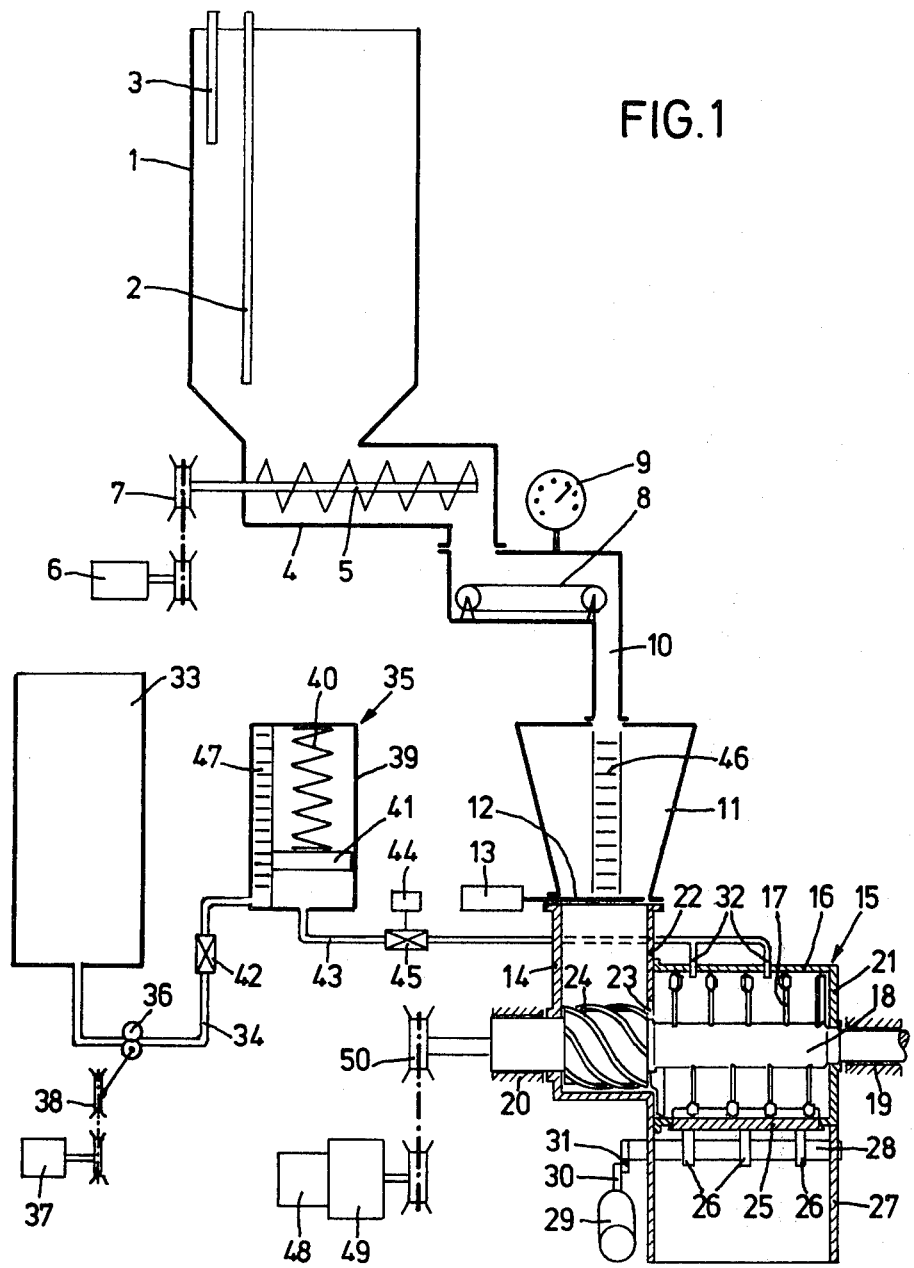
FIG. 1 is a somewhat diagrammatic illustration, partially in cross-section of an apparatus according to the present invention.

A volumetrically operating metering device is located at the lower end of a feed hopper 1, this hopper being kept filled within predetermined limits, with the material to be processed, by means of level sensors 2, 3. The metering device includes a feed screw 5 disposed in a housing 4. The feed screw 5 is driven by a drive motor 6 via a continuously adjustable drive 7. A continuous volume of material to be processed is drawn out of the feed hopper 1 by means of the feed screw 5. When material with considerably varying specific gravity is to be handled, this continuous volume is fed via a gravimetric monitoring device located downstream of the volumetrically operating metering device, the gravimetric monitoring device including, in the present case, a conveyor-type weigher 8. In the event of variations in the volume (weight) per unit time, indicated on an indicator 9 of conveyor-type weigher 8, the material coming from the volumetrically operating metering device can be modified by adjustment of the drive 7 either manually or by appropriate control, devices in such manner that in each case a continuous volume, i.e., constant weight of material per unit time, falls from the gravimetric monitoring device, the conveyor-type weigher 8, through a downpipe 10 into an intermediate container 11. This intermediate container 11 is closable at its bottom with a sealing device in the form of a sealing slide 12, this slide capable of being opened and closed very rapidly by an appropriate drive, for example a hydraulic or pneumatic operating cylinder 13.

A device 15 for processing thermoplastics or thermosetting plastics is connected downstream from the intermediate container 11 through a connecting pipe 14. The device 15 can be constructed, for example, as shown and described in U.S. Pat. No. 3,266,738. As shown in FIG. 1, the device 14 is provided with an essentially cylindrical container 16, in which a shaft 18, provided with mixing tools 17 extending radially therefrom, is disposed concentrically, this shaft being supported in bearings 19, 20. The container 16 is completely closed at one end by an end wall 21, this wall having only one corresponding opening for the shaft 18. At the other end, the shaft 18 is brought out through an end wall 22, this wall having one opening 23. In the section located ahead of the opening 23, the shaft 18 is provided with a feed screw 24, this feed screw being located in the bottom region of the connecting pipe 14. A dump valve 25 is provided in the lower region of the container 16, this valve being openable or closable by a lever 26, mounted on a shaft 28 supported in a machine frame 27. A hydraulic operating cylinder 29 is provided for this purpose, an operating piston 30 of this cylinder engaging a bent lever 31 mounted eccentrically at the corresponding end of the shaft 28.

A plurality of nozzles 32 are provided in an upper wall of the cylindrical container 16. In addition, a liquid reservoir 33 is provided, from which a pipe 34 leads to an intermediate liquid container 35 made in the form of a pressurized vessel. A metering pump 36 is connected to the pipe 34, this pump being driven by a drive motor 37 through a continuously adjustable drive 38. The intermediate liquid container 35 consists of a cylindrical container 39, in which a piston 41 is displaceably mounted, this piston being subjected to pressure from above by compressed spring 40. The pipe 34 terminates below near the bottom of the container 39. A check valve 42 is likewise disposed in the pipe 34. A pipe 43 leads from the bottom of the container 39 to the nozzles 32, to which a rapidly closing valve 45 is connected, this valve being actuable by a hydraulic drive 44. The intermediate material container 11 and the intermediate liquid container 35 can be provided with a respective section 46, 47 made of transparent material extending over their respective lengths, on which a level-indicating scale is mounted, these scales allowing an optical check of the amount of material or liquid located in intermediate material container 11 and the intermediate liquid container 35. The shaft 18 of the device for processing thermoplastics and thermosetting plastics is driven by a continuously rotating drive motor 48 through a hydrodynamic drive 49, i.e., a hydrodynamic torque converter, and a continuously adjustable drive 50.

Figure 2A:
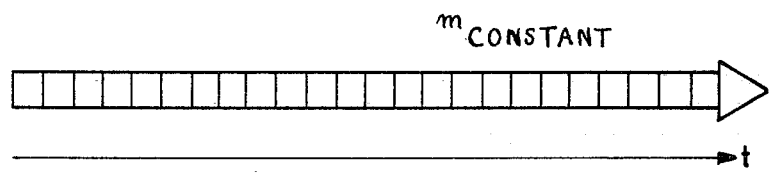
FIGS. 2A–2C are respective graphic representations which show the metering of the material, the feed of the material, and processing of the material, as functions of time.
Figure 2B:
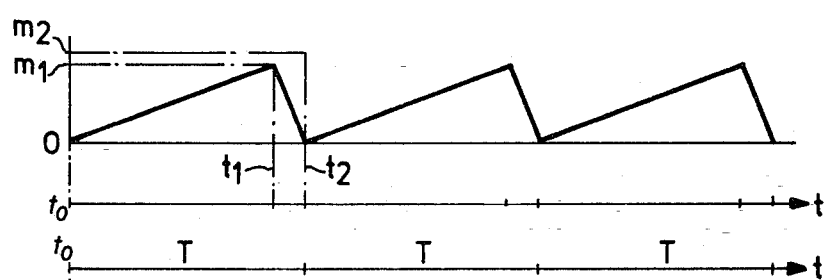
Figure 2C:
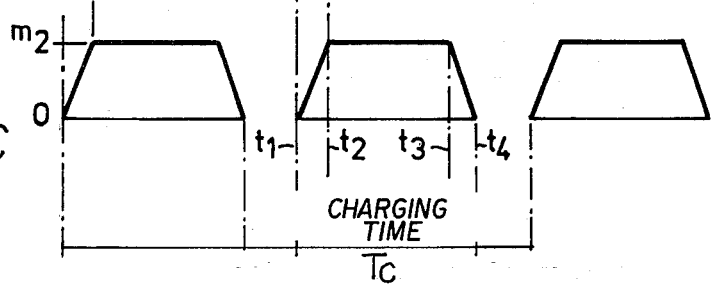

The method of operation of the apparatus of FIG. 1 is to be made apparent from the graphs shown in FIGS. 2A–2C. By means of the volumetrically operating metering device and under gravimetric control if necessary, a flow of material $m_{constant}$ which is constant over time t (FIG. 2A) is fed into the intermediate container 11, the sealing slide 12 being closed. As shown FIG. 2B, the amount of material located in the intermediate container 11 increases from 0 to a predetermined amount $m_1$ in the time between $t_0$ and $t_1$. Then, the sealing slide 12 is suddenly opened by the operating cylinder 13, so that the entire volume $m_1$ drops from intermediate container 11 into the connecting pipe 14. Immediately after this dumping step is completed, the sealing slide 12 closes again. Of course, material in a continuous flow as shown in FIG. 2A can continue to be fed during this dumping step, the material then dropping directly into the connecting pipe 14. Therefore, when the sealing slide 12 is opened, the volume $m_2$ which was fed in a continuous stream during the interval from $t_0$ to $t_2$ is dumped into the connecting pipe 14. The sealing slide 12 is closed again at time $t_2$. The time period from $t_1$ to $t_2$ is very short relative to the time period from $t_0$ to $t_1$. This process is repeated continuously. The time from $t_0$ to $t_2$ is the cycle T of the entire installation. As mentioned above, the shaft 18 of the device 15 rotates continuously so that the material which enters the connecting pipe 14 during the interval from $t_1$ to $t_2$ by action of the feed screw 24 is fed nearly instantaneously into the cylindrical container 16, where it is processed. At the end of processing, at time $t_3$, the dump valve 25 is opened by the operating cylinder 29 and the completely processed material is expelled. This dumping step is complete at time $t_4$. The time period from $t_1$ to $t_4$ is the charging time $T_C$ of the device 15. This charging time $T_C$ must in any case be slightly shorter than the cycle T of the intermediate container 11. The latter periods are shown in FIG. 2C. The addition of the liquid is similar in principle. The metering pump 36 operates continuously and, during the time period from $t_0$ to $t_1$, the intermediate liquid container 35 is filled with appropriate displacement of the piston 41 with additional compressing of the spring 40. At time $t_1$, the rapidly closing valve 45 is opened, whereby the amount of liquid contained in the container 39, under action of the spring 40, is sprayed in a very short time (for example until time $t_2$) through the nozzles 32 into the cylindrical container 16. The check valve 42 prevents the liquid from returning into the line 34. Therefore, within one cycle, the volume of liquid supplied during cycle T from the metering pump 36 is fed into the container 16, whereby these cycles can be displaced timewise relative to the cycles of the intermediate container 11.

The material supplied from the feed hopper 1 consists of thermoplastic or thermosetting plastics in powder form, already premixed with colorants, fillers or the like. The liquids that are supplied from the liquid supply container 33 can be plasticizers or the like. This material, to which the liquid is added if necessary, is gelled, and granulated if necessary, in the device 15 in known fashion by the internal frictional heat which is generated during operation as a result of rotation of the shaft 18 with its associated mixing tools 17. This portion of the process and the device 15 have been known per se for a long time of themselves and are conventional in the art. Similar devices, which could be used for the device 15, are sold under the protected trademark Gelimat. This portion of the process itself is described, for example, in the German Auslegeschrift No. 11 18 959.

Figure 3:
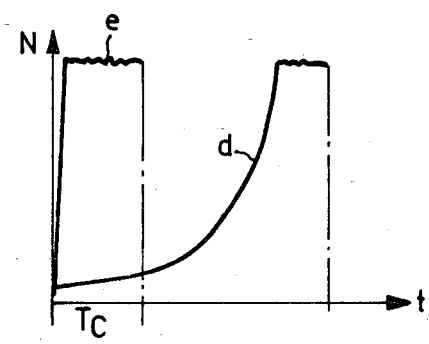
FIG. 3 is a graphic representation of power plotted as a function of time.

In FIG. 3, the power N is plotted as a function of time as a curve d, the power being applied by the drive to the device 15 when the shaft 18 is driven at a constant rpm. As this curve shows, the power N initially increases very slowly, then relatively steeply until it reaches a maximum. At this point, it remains approximately constant for a short time, corresponding to the softening interval of the material to be processed. The area beneath curve d gives the amount of work furnished, as well as that essentially absorbed by the material and converted into heat.

If, as in the present case, an approximately constant power is applied to the material as a function of time as shown in a curve e the work required for processing the material in a very much shorter time, namely the charging time $T_C$, is applied to the material, i.e., the charging time $T_C$ in the latter type of drive is very much shorter than in the case of a drive with a constant rpm. Accordingly, the rpm of the shaft 18 decreases from an extremely high value at the beginning of the charging time to an appropriately lower value at the end of the charging time $T_C$.

Instead of the common input of plastic raw materials already premixed with colorants, fillers, or the like, by means of a metering means, a number of continuously operating metering means can be provided, such means likewise feeding the various additives continuously into the intermediate container 11, whereby the individual metering means must naturally be coupled together.

The shaft 18 rotates at an rpm such that the mixing tools 17 have a circumferential velocity of from about 20 to about 100 m/sec.

It is to be appreciated that the foregoing description and accompanying figures of drawing relate to a preferred exemplary method and apparatus for carrying it out which are set out by way of example, not by way of limitation. Other embodiments and numerous variants are possible without departing from the spirit and scope of the invention, its scope being defined by the appended claims.

What is claimed is:

1. In a method of processing plastics comprising supplying a batch comprising a predetermined quantity of material to be processed to a container having mixing members therein, causing the batch of material to be gelled by heat produced by friction as the mixing members are moved through the batch of material, expelling the entire batch of processed material from the container, and, only after said expelling step, repeating the supplying, causing and expelling steps with another batch of material, the improvement by which a batch of material may be continuously formed while another batch is being processed, comprising the steps of:

continuously providing material to be processed in a continuous, constant, gravimetrically-determined quantity stream, whereby a constant weight of material is provided per unit of time, wherein the rate of material being provided is sufficient to provide said predetermined quantity batch of material in approximately the time necessary to complete said supplying, causing and expelling steps;

temporarily storing the material being continuously provided in said providing step until a batch of approximately said predetermined quantity has been accumulated; and feeding the entire amount of temporarily stored material to the container at predetermined cyclic time intervals corresponding to the accumulation of a batch of approximately said predetermined quantity during said temporarily storing step, whereby said time intervals will also necessarily approximate the time necessary to complete said supplying, causing and expelling steps, and wherein said feeding step constitutes said supplying step.

2. A method according to claim 1, further including the step of continuously providing liquid in a continuous volume to a temporary storage container, temporarily storing the liquid, and dispensing all of the liquid temporarily stored in the temporary storage container into the container at predetermined cyclic time intervals, the length of said time intervals approximating the time necessary to complete said supplying, causing and expelling steps.

3. A method according to claim 1, including moving the mixing members continuously.

4. A method according to claim 1, wherein the amount of time necessary to complete said feeding step is shorter than the period of time within which the material is temporarily stored prior to said feeding step.

5. A method according to claim 1, wherein the material is subjected to an approximately constant force during processing.

6. A method according to claim 1, including supplying liquid to the container.

7. A method according to claim 1, including granulating the material in the container.

* * * * *